United States Patent
Winkler et al.

(10) Patent No.: US 8,484,457 B2
(45) Date of Patent: Jul. 9, 2013

(54) METHOD OF SECURELY PAIRING DEVICES WITH AN ACCESS POINT FOR AN IP-BASED WIRELESS NETWORK

(75) Inventors: David B. Winkler, Seattle, WA (US); Yaro P. Brock, Bellevue, WA (US); Jasdeep S. Chugh, Renton, WA (US); Michael C. Kemery, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 233 days.

(21) Appl. No.: 12/401,550

(22) Filed: Mar. 10, 2009

(65) Prior Publication Data

US 2010/0235621 A1    Sep. 16, 2010

(51) Int. Cl.
*H04L 29/06* (2006.01)

(52) U.S. Cl.
USPC .......................................................... 713/153

(58) Field of Classification Search
USPC ..... 713/153; 380/270, 283; 370/401; 345/2.3
See application file for complete search history.

(56) References Cited

U.S. PATENT DOCUMENTS

| | | | |
|---|---|---|---|
| 4,998,271 A | 3/1991 | Tortola et al. | |
| 5,513,263 A | 4/1996 | White et al. | |
| 6,493,629 B1 | 12/2002 | Van Bosch | |
| 6,612,489 B2 * | 9/2003 | McCormick et al. | 235/382 |
| 6,615,035 B1 | 9/2003 | Lucidarme et al. | |
| 6,985,583 B1 * | 1/2006 | Brainard et al. | 380/44 |
| 7,295,556 B2 | 11/2007 | Roese et al. | |
| 7,376,221 B1 | 5/2008 | Remy et al. | |
| 7,433,673 B1 | 10/2008 | Everson et al. | |
| 7,610,062 B2 | 10/2009 | Beeman et al. | |
| 7,701,947 B2 | 4/2010 | Cunetto et al. | |
| 7,773,579 B1 | 8/2010 | Liu et al. | |
| 7,792,093 B2 | 9/2010 | Myhre et al. | |
| 8,160,614 B2 | 4/2012 | Shaffer | |
| 8,320,344 B2 | 11/2012 | Hodroj et al. | |
| 2001/0052006 A1 | 12/2001 | Barker et al. | |

(Continued)

FOREIGN PATENT DOCUMENTS

| | | |
|---|---|---|
| CA | 2666472 | 8/2010 |
| EP | 1530321 A1 | 5/2005 |

(Continued)

OTHER PUBLICATIONS

Belkin International, Inc., "Belkin N1 Vision Wireless Router User Manual", Jul. 11, 2007, pp. 20-82.*

(Continued)

*Primary Examiner* — Michael S McNally

(57) ABSTRACT

A wireless access point and method of using a wireless access point to allow a user to use a pre-determined security key provided with the access point or a personal security key that is provided by the user. The access point is purchased with a pre-determined security key. A user of the access point may press a pairing button on the access point to automatically pair other devices with the access point using the pre-determined security key. A label with a passphrase that corresponds to the pre-determined security key is provided with the access point, allowing the user to manually enter the passphrase into devices that cannot automatically pair with the access point. The wireless access point also has a "security on/off" button. When the user presses the security on/off button, the access point may cease use of the pre-determined security key in favor of a personal security key.

27 Claims, 14 Drawing Sheets

U.S. PATENT DOCUMENTS

| | | | |
|---|---|---|---|
| 2002/0147926 A1 | 10/2002 | Pecen et al. | |
| 2002/0188581 A1 | 12/2002 | Fortin et al. | |
| 2003/0119480 A1 | 6/2003 | Mohammed | |
| 2004/0078708 A1 | 4/2004 | Li et al. | |
| 2004/0133689 A1* | 7/2004 | Vasisht | 709/228 |
| 2004/0192299 A1 | 9/2004 | Wilson et al. | |
| 2004/0203815 A1 | 10/2004 | Shoemake et al. | |
| 2005/0054342 A1 | 3/2005 | Otsuka | |
| 2005/0063542 A1* | 3/2005 | Ryu | 380/259 |
| 2005/0078819 A1 | 4/2005 | Hsu et al. | |
| 2005/0083911 A1 | 4/2005 | Grabelsky et al. | |
| 2005/0094592 A1 | 5/2005 | Schmidt | |
| 2005/0114504 A1 | 5/2005 | Marolia et al. | |
| 2005/0159149 A1 | 7/2005 | Wen et al. | |
| 2005/0160287 A1 | 7/2005 | Mehta et al. | |
| 2005/0174992 A1 | 8/2005 | Files et al. | |
| 2005/0243809 A1 | 11/2005 | Best et al. | |
| 2006/0075485 A1* | 4/2006 | Funahashi et al. | 726/19 |
| 2006/0121941 A1 | 6/2006 | Shiflett | |
| 2006/0223498 A1 | 10/2006 | Gallagher et al. | |
| 2006/0256800 A1 | 11/2006 | Harrington et al. | |
| 2006/0293024 A1 | 12/2006 | Benco et al. | |
| 2006/0293038 A1 | 12/2006 | Walter et al. | |
| 2006/0293082 A1 | 12/2006 | Neuhaus | |
| 2007/0008885 A1 | 1/2007 | Bonner | |
| 2007/0026862 A1 | 2/2007 | Hicks et al. | |
| 2007/0049342 A1 | 3/2007 | Mayer et al. | |
| 2007/0079113 A1 | 4/2007 | Kulkarni et al. | |
| 2007/0115900 A1* | 5/2007 | Liang et al. | 370/338 |
| 2007/0123231 A1 | 5/2007 | Kim | |
| 2007/0168553 A1* | 7/2007 | Jones et al. | 709/245 |
| 2007/0177562 A1 | 8/2007 | Castrogiovanni et al. | |
| 2007/0195803 A1 | 8/2007 | Lowery et al. | |
| 2008/0020773 A1 | 1/2008 | Black et al. | |
| 2008/0046998 A1* | 2/2008 | Cromer et al. | 726/17 |
| 2008/0095086 A1* | 4/2008 | Linkola et al. | 370/310 |
| 2008/0151866 A1 | 6/2008 | Wu | |
| 2008/0160914 A1* | 7/2008 | McRae et al. | 455/41.2 |
| 2008/0189550 A1 | 8/2008 | Roundtree | |
| 2008/0254833 A1 | 10/2008 | Keevill et al. | |
| 2008/0311917 A1 | 12/2008 | Marathe et al. | |
| 2009/0043876 A1 | 2/2009 | Zhang et al. | |
| 2009/0074187 A1* | 3/2009 | Inoue et al. | 380/270 |
| 2009/0085760 A1* | 4/2009 | Lee | 340/669 |
| 2009/0132675 A1 | 5/2009 | Horn et al. | |
| 2009/0154701 A1* | 6/2009 | Kosaraju et al. | 380/270 |
| 2009/0163245 A1 | 6/2009 | Oozeki | |
| 2009/0215394 A1* | 8/2009 | Dewan | 455/41.2 |
| 2009/0220216 A1 | 9/2009 | Marsh et al. | |
| 2010/0014506 A1 | 1/2010 | Linkola et al. | |
| 2010/0014507 A1 | 1/2010 | Linkola et al. | |
| 2010/0265845 A1* | 10/2010 | Lampen | 370/254 |
| 2011/0299686 A1* | 12/2011 | Saboff et al. | 380/274 |

FOREIGN PATENT DOCUMENTS

| | | |
|---|---|---|
| EP | 1865656 A1 | 12/2007 |
| WO | WO-2004102941 A1 | 11/2004 |
| WO | WO-2006018047 A1 | 2/2006 |
| WO | WO-2006062907 A1 | 6/2006 |
| WO | WO-2006078430 A2 | 7/2006 |
| WO | WO-2006135285 A2 | 12/2006 |
| WO | WO-2007015075 A1 | 2/2007 |
| WO | WO-2008036938 A2 | 3/2008 |
| WO | WO-2010099229 | 9/2010 |

OTHER PUBLICATIONS

International Search Report and Written Opinion for PCT/US2010/026715; Filed on Mar. 9, 2010, Applicant: T-Mobile USA, Inc., Mailed on Oct. 18, 2010, 10 pages.

"Frequently Asked Questions: Wi-Fi Protected Setup," Wi-Fi Alliance 2006, pp. 1-4.

"Wi-Fi Protected Setup," Wi-Fi Alliance 2007, http://www.wi-fi.org/wifi-protected-setup/ [Accessed on Mar. 31, 2009].

N1 Wireless Router User Manual, Belkin International, Inc. 2007, 104 pages.

"Dontronics, USB to RJ-11 VoIP Phone Adaptor," http://www.dontronics.com/phoneconnector.html, date accessed Apr. 19, 2006], 7 pages.

"IVT Corporation, Bluetooth PSTN Voice AP," http://www.ivtcorporation.com/products/ap/index.php, [date accessed Apr. 19, 2006], 3 pages.

"Telco Systems: A BATM Company, Access200 Product Family Voice over IP Analog Telephone Adapters," Copyright 2005 Telco Systems, 2 pages.

"Vonage and Motorola Announce a Co-Branded Internet Telephone Adaptor with Wireless Router," PR Newswire (U.S.), Mar. 14, 2007, 2 pages.

Bertolucci, Jeff, "Vonage's Flashy V-Portal Offers Easier VoIP Setup," PC World Communications, Apr. 1, 2008, 1 page.

Greene, Tim, "Vonage Tailors VoIP for Small Firms: Flat-fee Dialing Includes Local, Long-Distance Calls," Network World, Jun. 23, 2003, 2 pages.

Helander, Johannes et al., "Secure Web Services for Low-Cost Devices," Proceedings of the Eighth IEEE International Symposium on Object-Oriented Real-Time Distributed Computing (ISORC'05), May 18-20, 2005, pp. 130-139.

Honan, Mathew, "I Am Here: One Man's Experience With the Location-Aware Lifestyle," Wired Magazine: 17.2, http://www.wired.com/gadgets/wireless/magazine/17-02/Ip_guineapig?currentPage=all, [date accessed Sep. 28, 2010], pp. 1-7.

Houghton, Mike, "Cellular Modems: 3G Access on the Move," article downloaded from www.enterpriseplanet.com on May 27, 2009 bearing a date of May 25, 2006, Enterprise IT Planet, 4 pages.

IEEE-SA Standards Board, IEEE Std. 802.11, 1999 Edition, Reaffirmed 2003, 37 pages.

International Search Report and Written Opinion, International Application No. PCT/US2007/82010, Filed on Oct. 19, 2007, Applicant: T-Mobile USA, Inc., Date of Mailing: Jun. 16, 2008, 10 pages.

International Search Report and Written Opinion, International Application No. PCT/US2007/82010, Filed on Oct. 19, 2007, Applicant: T-Mobile USA, Inc., Date of Mailing: Jun. 18, 2008, 10 pages.

International Search Report and Written Opinion, International Application No. PCT/US2007/82285, Filed on Oct. 23, 2007, Applicant: T-Mobile USA, Inc., Date of Mailing: Mar. 10, 2008, 10 pages.

International Search Report and Written Opinion, International Application No. PCT/US2009/051072, Filed on Jul. 17, 2009, Applicant: T-Mobile USA, Inc., Date of Mailing: Nov. 6, 2009, 12 pages.

Lazarowitz, Elizabeth, "Easy Call: Phoning Via Web," New York Daily News, Feb. 5, 2007, New York, 3 pages.

Shaw, Keith, "VoIP Invades the Home Network," Network World, Aug. 30, 2004, 1 page.

European Patent Office, Supplementary European Search Report and Opinion, EP Patent Application 07854249, mailed Jun. 4, 2012, 6 pages, WO2008051874.

International Searching Authority, International Search Report, PCT Application PCT/US2010/025271, mailed Dec. 28, 2010, 3 pages.

International Searching Authority, Written Opinion, PCT Application PCT/US2010/025271, mailed Dec. 28, 2010, 4 pages.

* cited by examiner

METHOD OF SECURELY PAIRING DEVICES WITH AN ACCESS POINT FOR AN IP-BASED WIRELESS NETWORK

CROSS-REFERENCE TO RELATED APPLICATIONS

This application is related to U.S. patent application Ser. No. 11/552,089, filed 23 Oct. 2006, entitled "Method of Deploying an Access Point for an IP-Based Wireless Network." This application is also related to International Application No. PCT/US2007/051938082160, filed 22 Oct. 2007, entitled "System and Method to Indicate IP-Based Wireless Telecommunication Service Availability and Related Information," which claims the benefit of U.S. Provisional Application No. 60/862,596, filed Oct. 23, 2006, entitled "System and Method to Indicate IP-Based Wireless Telecommunications Service Availability," and U.S. Provisional Application No. 60/853,149, filed Oct. 20, 2006, entitled "Personalization of Telecom Service Based Upon User Location."

BACKGROUND

A variety of technologies enable telecommunication services to be offered using Internet Protocol (IP). Commonly referred to as Voice over IP, or VoIP, such technologies enable telecommunications on any public or private IP network, including the Internet. VoIP technology permits a user to receive IP-based telecommunications services through a variety of devices, including a desktop computer, a notebook computer, an analog handset used in conjunction with a VoIP telephone adapter, a VoIP-enabled handset, or other like device.

Increasingly, mobile devices, such as notebook computers, personal digital assistants (PDAs), wireless handhelds, wireless handsets, or other similar devices, are also being enabled to receive IP-based telecommunications services. Such services are provided by enabling the mobile device to communicate with a wireless router and access any IP-based wireless access network, such as a network based on the IEEE 802.16 (WiMAX), IEEE 802.20 Mobile Broadband Wireless Access (MBWA), Ultra Wideband (UWB), IEEE 802.11 wireless fidelity (WI-FI™), and IEEE 802.15 BLUETOOTH™ standards.

Moreover, dual-mode mobile telecommunications devices may be enabled to communicate with any IP-based wireless access network. For instance, Unlicensed Mobile Access (UMA) technology allows wireless service providers to merge cellular networks, such as Global System for Mobile Communications (GSM) networks, and IP-based wireless networks into one seamless service with one mobile device, one user interface, and a common set of network services for both voice and data. UMA technology has recently been accepted into release 6 of the 3rd Generation Partnership Project (3GPP) standard as a General Access Network (GAN). With UMA or GAN solutions, subscribers may move between cellular networks and IP-based wireless networks with seamless voice and data session continuity as transparently as they move between cells within the cellular network. Seamless in-call handover between the IP-based wireless network and cellular network ensures that the user's location and mobility do not affect the services delivered to the user. Services may be identical whether connected over the IP-based wireless network or the cellular network. UMA technology effectively creates a parallel radio access network, the UMA network, which interfaces to the mobile core network using standard mobility-enabled interfaces. The mobile core network remains unchanged. The common mobile core network makes it possible for the service provider to have full service and operational transparency. The existing service provider Business Support Systems (BSS), service delivery systems, content services, regulatory compliance systems, and Operation Support Systems (OSS) can support the UMA network without change. Service enhancements and technology evolution of the mobile core network apply transparently to both cellular access and UMA.

Although IP-based wireless telecommunications technologies offer substantial benefits to users, service providers may face many obstacles to the widespread adoption and use of these technologies. Often, users are very hesitant to embrace new technologies with which they are not familiar. The service providers must therefore convince users of the benefits of using an IP-based mobile device and related services, including by making the solution easy for a user to deploy. Offering a user an IP-based wireless telecommunications service is different than offering standard telecommunications service, or standard wireless telecommunications service, in that a portion of the IP-based wireless telecommunications technology may need to be deployed by the user if the user is to take full advantage of the technology. Specifically, the user may desire to deploy an access point in his or her home, office, or other frequented location. Such a deployment may not only lead to user frustration and an increase in customer service calls to the service provider if deployment proves difficult, but also to a potential loss of a customer. As a result, it would be beneficial for the service provider to simplify the deployment process so that a user can quickly and easily begin to use the IP-based wireless telecommunications service with a minimum amount of assistance from the service provider.

DETAILED DESCRIPTION

A wireless access point and method of using a wireless access point to allow a user to use a pre-determined security key that is associated with the access point or to use a personal security key that is provided by the user to securely communicate with one or more remote devices is disclosed. The access point is purchased or acquired with a pre-determined security key that is associated with the access point. A user of the access point may press a pairing button on the access point to automatically pair other devices with the access point using the pre-determined security key to encrypt the communication between the access point and the devices. A label with a passphrase that corresponds to the pre-determined security key is provided with the access point. The user may manually enter the passphrase into those devices that would otherwise be unable to pair with the access point using the automatic pairing method.

Rather than use the pre-determined security key, a user may desire to use a personal security key with the access point. To facilitate use of a personal security key, the wireless access point has a "security on/off" button. Depending on how the security on/off button is configured, the security on/off button allows a user to control when the pre-determined security key is used by the access point to encrypt communications, when a personal security key is used by the access point to encrypt communications, and when security for the access point is disabled in its entirety.

In some embodiments, the access point may include a rotary dial, buttons, or other user control to enable a user to directly input a security string into the access point. The security string is used by the access point to derive a 256 bit or greater personal security key for the access point. Providing a control on the access point greatly simplifies the use of the access point, as it allows a user to configure the access point to use a personal security key without the user having to use a computer to modify the access point settings.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. EXAMPLE VoIP AND UMA NETWORKS

Figure 1:
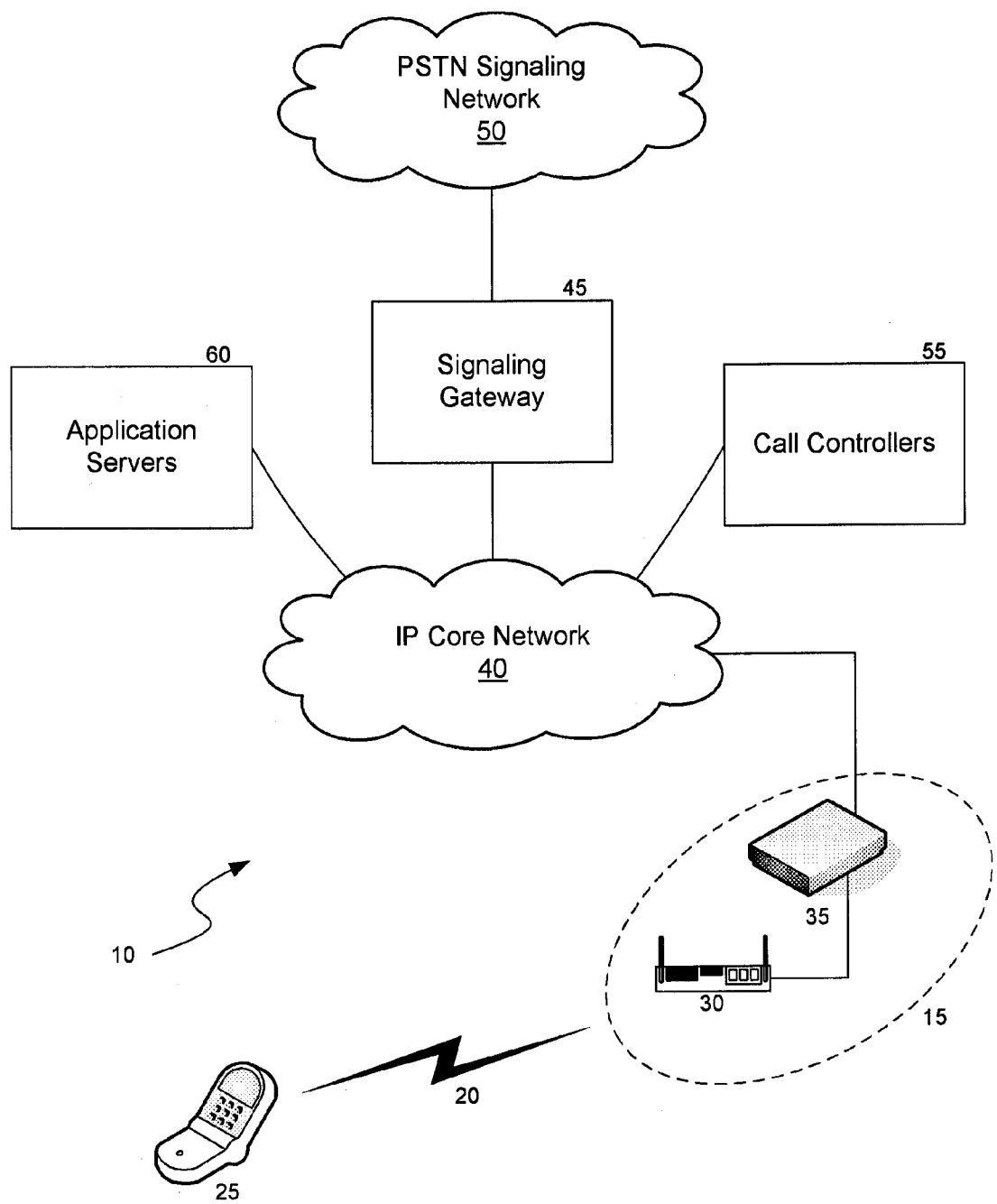
FIG. 1 illustrates an example Voice over IP system.

FIG. 1 illustrates the components of a generalized Voice over Internet Protocol (VoIP) system 10 for mobile communication devices. The system comprises one or more access points (APs) 15 that can accept communications 20 from mobile devices 25. The access point includes a wireless router 30 and a broadband modem 35 that enable connection to an Internet Protocol (IP) network 40. IP network 40 may be one or more public networks, private networks, or combination of public and private networks. IP packets that carry communications from the mobile device 25 are received at the access point 15 and transported through the IP network 40 to a signaling gateway 45. Signaling gateway 45 is typically operated by a service provider and converts the VoIP signal to a traditional phone service signal. The phone signal is then conveyed to the intended recipient via a public switched telephone network (PSTN) 50. A call controller 55 that is located in the service provider's network provides call logic and call control functions. An application server 60 that is located in the service provider's network provides logic and execution of one or more applications or services that are offered by the server provider, such as implementing various access and security rules.

The VoIP system depicted in FIG. 1 is an architecture that broadly enables any mobile device to receive IP-formatted telecommunication services. One application of this technology is Unlicensed Mobile Access (UMA) technology, which allows cellular service providers to offer their products and services seamlessly over Internet-connected broadband networks. Mobile devices may utilize licensed, semilicensed and unlicensed spectrums (such as spectrums for cellular communications) and alternate licensed and unlicensed spectrums (such as spectrums for IP-based wireless communication). For example, dual-mode cellular phones may access a cellular network, such as a GSM, CDMA, or other network, or an IP-based wireless network, such as a network based on the IEEE 802.16 (WiMAX), IEEE 802.20 Mobile Broadband Wireless Access (MBWA), Ultra Wideband (UWB), IEEE 802.11 wireless fidelity (WI-FI™), or IEEE 802.15 BLUE-TOOTH™ standards. The IP-based networks are accessed via wireless access points that are typically connected to a DSL (Digital Subscriber Line) modem, a cable modem, a satellite modem, or any other broadband Internet connection. The access points may be open or closed, and may be located in a subscriber's home, in other apartments or residences, in public locations such as coffee shops, libraries, or schools, or in corporate locations.

When a mobile device accesses an IP-based wireless network, information is initially formatted in the cellular system's native protocol (e.g., GSM, CDMA) and then encapsulated into Internet Protocol (IP) packets, transmitted to the access point, and communicated over the Internet to the cellular service provider's mobile core network. Such transmission bypasses the service provider's existing network of radio towers. Because the same cellular protocols are used in communications involving IP access points as with traditional radio towers, the cellular service provider maintains a large degree of system compatibility even though using an IP-based network. The systems of the cellular service provider that deliver content and handle mobility may not even need to be aware that a subscriber's mobile device is on an IP-based wireless telecommunications network. The system may instead assume the mobile device is on its native cellular network. The IP network is therefore abstracted with respect to the cellular network, regardless of whether the mobile device connects to the cellular network via a cell tower (for licensed spectrum access) or a wireless access point (for licensed, semilicensed or unlicensed spectrum access).

A non-exhaustive list of products and services available on IP-based wireless telecommunications networks includes not only voice services, but also supplementary services like call forwarding and call waiting, text messaging services like SMS, and data-based services like ringtone downloads, game downloads, picture messaging, email and web browsing. Further, since a mobile device is connected to an IP network, all manner of data services available over such networks may be provided to the mobile device.

Figure 2A:
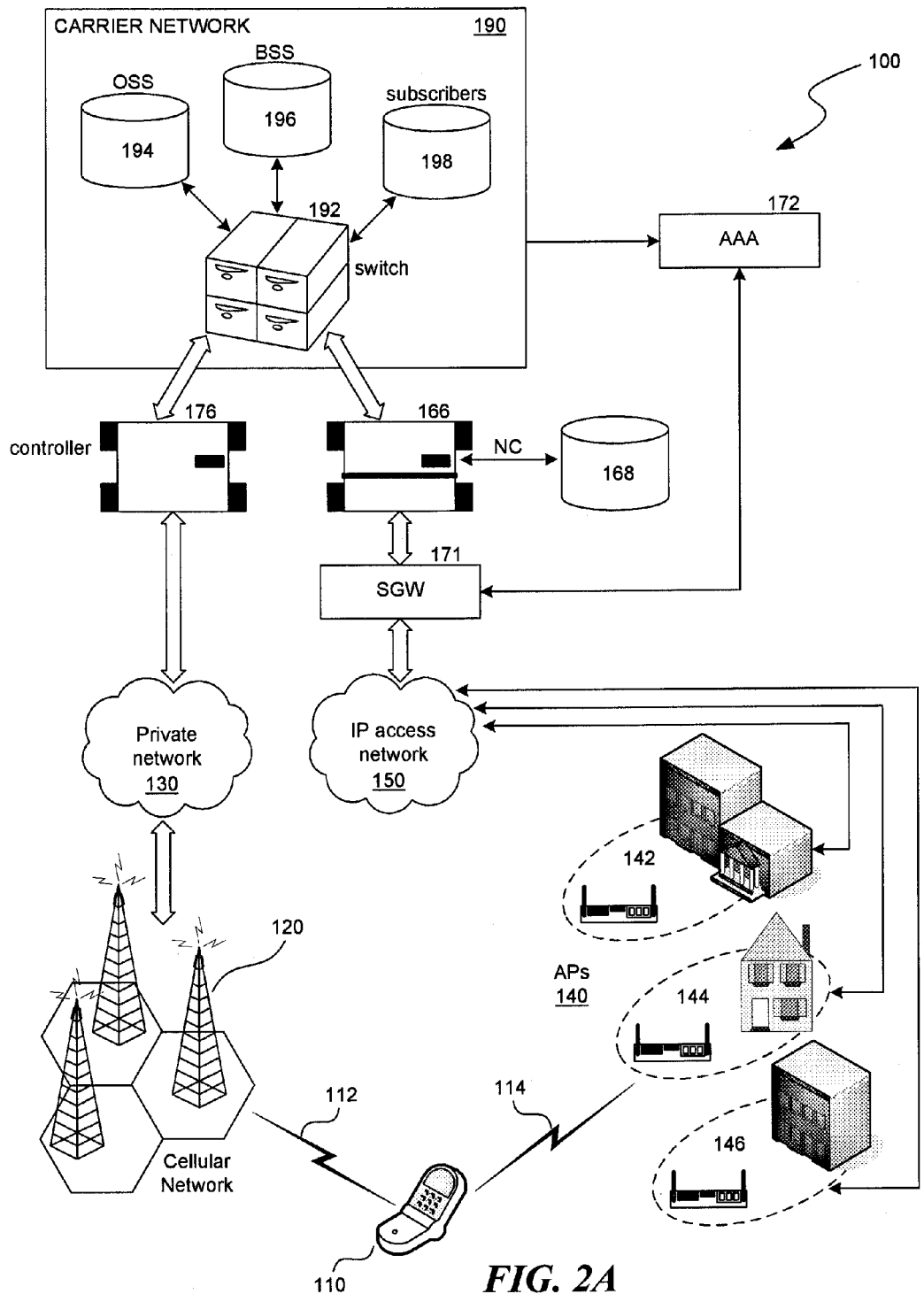
FIGS. 2A and 2B illustrate example converged wireless network systems that combine cellular networks with IP-based wireless telecommunications networks.

FIG. 2A is an illustration of a system 100 that combines a cellular telephone network with an IP-based wireless telecommunications network (e.g. a UMA network). The described system 100 accepts registration requests and communication connections from a mobile device 110 to either a cellular telephone network or to an IP-based wireless telecommunications network.

The example cellular telephone network includes one or more cell towers 120 that are configured to accept cellular communications 112 from mobile device 110. The cell towers 120 are connected to a controller (such as a base station controller/radio network controller (BSC/RNC)) 176 via a private network 130. The private network 130 can include a variety of connections such as T1 lines, a wide area network (WAN), a local area network (LAN), various network switches, and other similar components. Controller 176 controls network communication traffic to the carrier network 190, where all communications are managed. An example carrier network 190 includes a switch (such as a mobile switching center (MSC)) 192, which is configured to control data/call flows, perform load balancing, as well as other functions. A variety of system databases may also be accessed in the carrier network such as, e.g., an operation support subsystem (OSS) database 194, a business support system (BSS) database 196, and a central subscriber database that contains details of a carrier's subscribers (such as a home location register (HLR)) 198, for billing, call logging, etc.

The example network includes one or more access points (APs) 140 that can accept IP communications 114 from mobile device 110. An access point can be configured as part of a wireless network in one or more locations such as a public network 142, a home network 144, or a private business network 146. Each access point is coupled to an Internet Protocol (IP) network 150 through a broadband connection. IP packets that carry communications (data, voice, SMS, etc.) are routed from the access points to a security gateway (SGW) 171 through the IP network 150. The security gateway controls access to the network controller (NC) 166, which communicates with a database 168 for logging and accessing various data associated with communications. The network controller 166 is also configured to manage access with the carrier network 190 in a similar manner to that performed by the cellular network's cell tower controller 176.

Authentication of a request for access by a mobile device over the IP-based wireless telecommunications network is handled by the security gateway 171, which communicates with an authentication, access and authorization (AAA) module 172 as shown in FIG. 2A. Challenges and responses to requests for access by the mobile device are communicated between central subscriber database 198 and the AAA module 172. When authorization is granted, the security gateway 171 communicates the assignment of an IP address to the mobile device 110 that requested access. Once the IP address is passed to the mobile device 110 by the security gateway 171, the public IP address assigned to the device is passed to the NC.

Figure 2B:
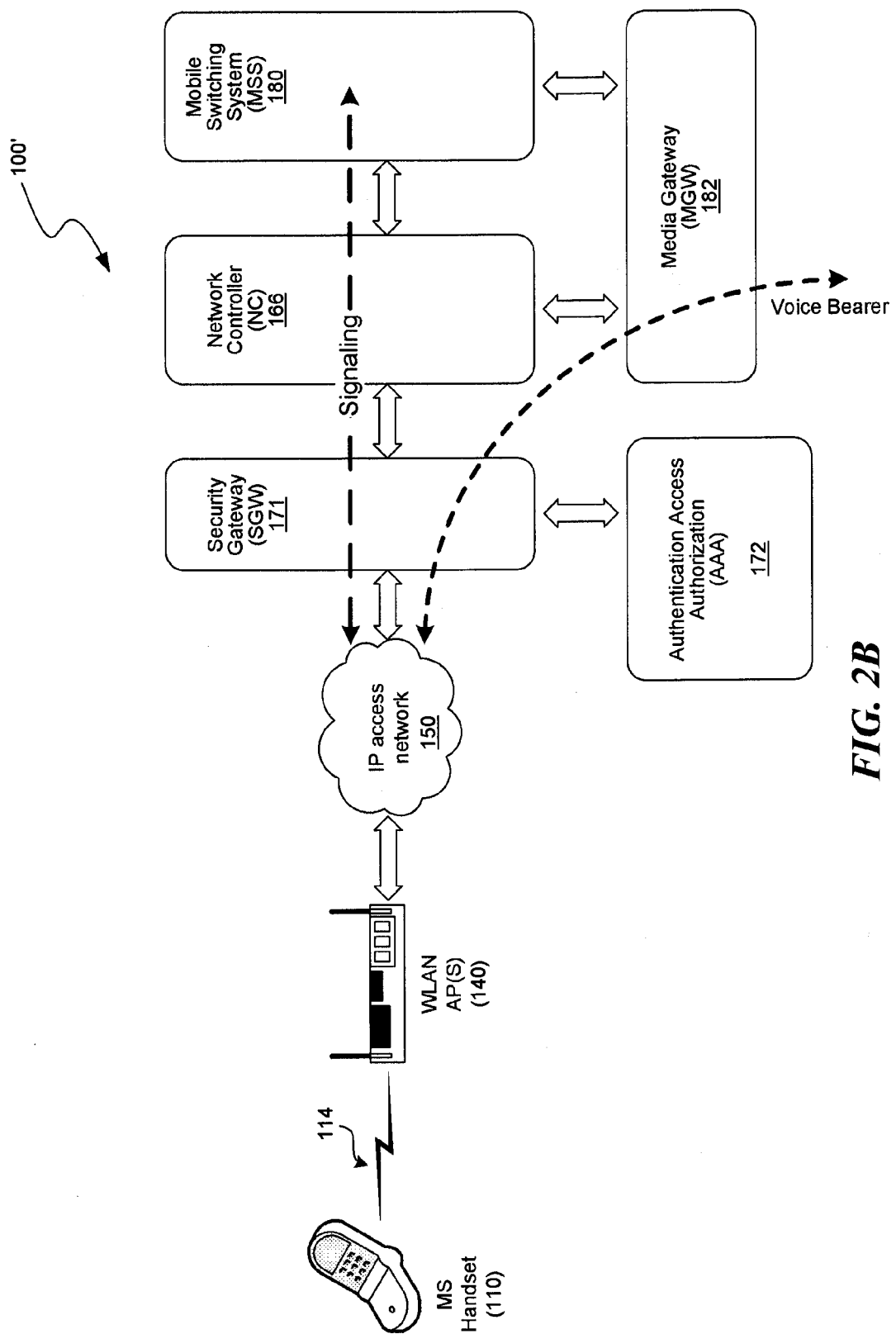

FIG. 2B illustrates another example system that combines a cellular telephone network with an IP-based wireless telecommunications network. The described system 100' accepts registration requests and communication connections from a mobile device 110 to either a cellular telephone network (not shown) or to an IP-based wireless telecommunications network. The system 100' includes one or more access points (AP) 140 that accept communications 114 from mobile device 110. Each access point is coupled to an IP-based wireless telecommunications network 150 through a broadband connection. IP network 150 routes communications (data, voice, SMS, etc.) between the access points and a security gateway (SGW) 171. The security gateway 171 controls access to the network controller (NC) 166, which communicates with a database (not shown) for logging and accessing various data associated with communications. Authentication, access, and authorization are handled by SGW 171 via AAA module 172, as previously described.

For the example system 100', the signaling path of a communication is routed through the NC 166 to a mobile switching system (MSS) 180, while the voice bearer path is routed through the NC 166 to a media gateway (MGW) 182. The signaling portion of a communication governs various overhead aspects of the communication such as, for example, when the communication starts, when the communication stops, initiating a telephone ring, characteristics of the transmitted data, etc. The voice bearer portion of the communication contains the actual content (either data or voice information) of the communication. The MGW 182 controls the content flow between the service provider and the mobile device 110, while the MSS 180 controls the signaling flow (or controls overhead-related flow) between the service provider and the mobile device 110.

Figure 3:
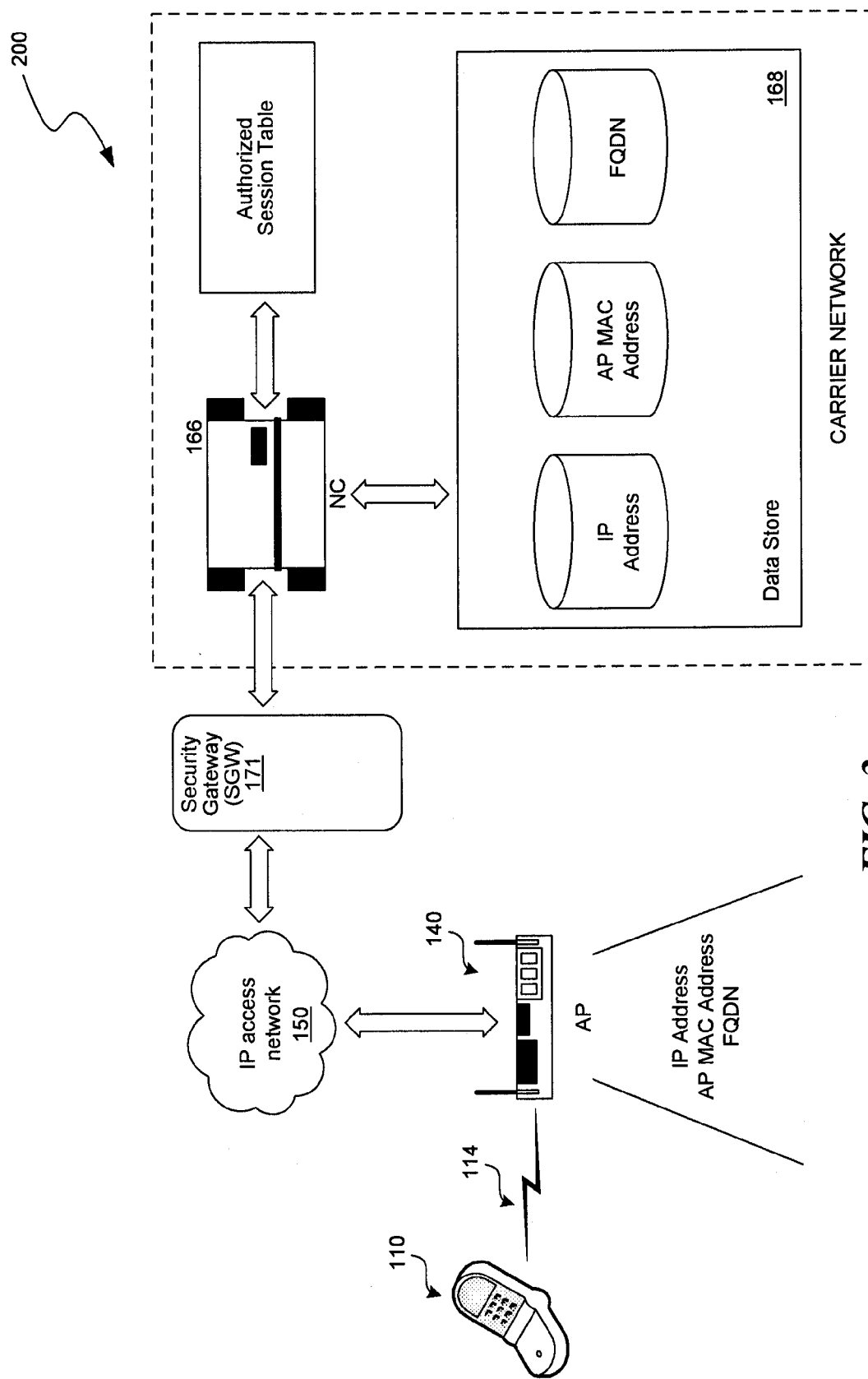
FIG. 3 illustrates a network controller configured in an IP-based wireless telecommunication network to authorize or reject access based on various identifiers.

FIG. 3 illustrates a configuration that utilizes a network controller for managing IP-based network authorization. A mobile device 110 initiates a connection request with an IP-based wireless telecommunications network via a wireless communication 114 to an access point (AP) 140. The access point 140 communicates with a network controller 166 via an IP access network 150 and a security gateway (SGW) 171. The network controller 166 monitors connection requests associated with each mobile device, processes each connection request, and either permits or rejects access to the IP-based wireless telecommunications network. Access to the IP-based wireless telecommunications network may be controlled based on at least one identifier that is associated with the mobile device. The IP-based wireless telecommunications network controller 166 queries a data store 168 to determine if the mobile device 110 is authorized for access to the IP-based wireless telecommunications network. Example identifiers that may be utilized to determine access includes a media access control (MAC) address associated with an access point, a mobile device or subscriber identifier (such as an International Mobile Subscriber Identifier WSW, an Internet Protocol (IP) address (or "Public IP address") associated with the access point, a fully qualified domain name (FQDN), or other similar types of information. The data store 168 may be a single database, table, or list, or a combination of databases, tables, or lists, such as one for IP addresses, one of MAC addresses, and one for FQDNs. The data store may include "blocked" identifiers as well as "authorized" identifiers. Authorized accesses to the IP-based wireless telecommunications network may be maintained by the network controller 166 in an authorized session table or similar data construct.

II. ACCESS NODE DEPLOYMENT

Figure 4:
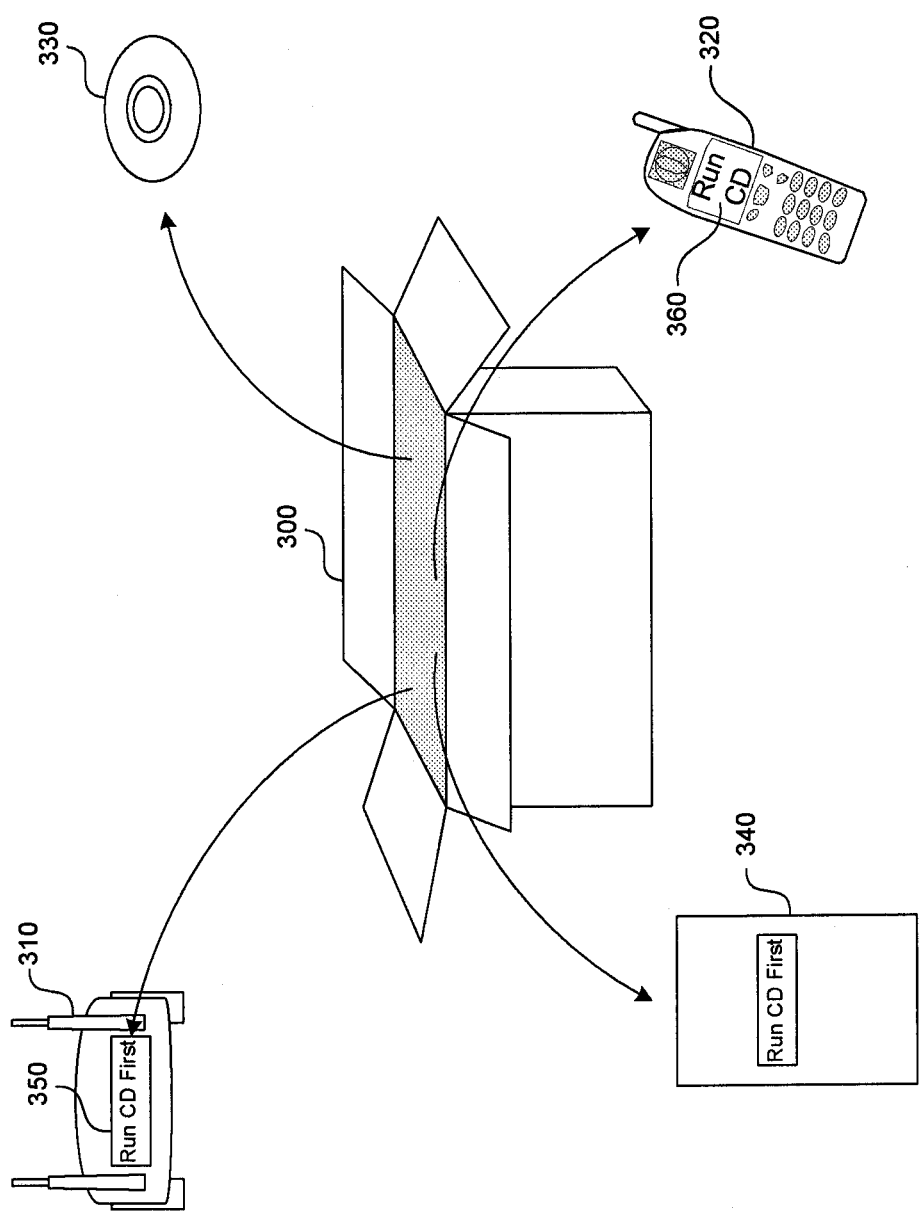
FIG. 4 is a perspective view of product packaging that includes components for implementing an access point for an IP-based wireless telecommunications network.

One of the factors that may influence the adoption and use of IP-based wireless telecommunications technology is the ease with which a user may purchase a IP-based wireless telecommunications device and begin using the service offered by a service provider. The simpler the deployment process is made, the more likely that users will be willing to adopt and use the technology. FIG. 4 is a perspective view of representative product packaging 400 that contains various components of an IP-based wireless telecommunications service offering by a service provider. Product packaging 400 is depicted as a single box, but may be one or more boxes, blister packs, or other packaging that allows for the safe and efficient delivery of the various components. Within the packaging are a number of components that are to be utilized by the user to deploy an access point for IP-based wireless telecommunications service. Also contained in the packaging are instructional materials that are designed to walk the user through the deployment and use of the provided components in a step-by-step fashion. Specifically, the product packaging contains some or all of the following components:

- A wireless router 310 and associated cabling and power cords (not shown). The router is intended to be utilized as a wireless access point to an IP network, and may be installed by the user in his or her home, office, or other location that he or she frequents and where he or she desires to use the IP-based wireless telecommunications service. The wireless router may be any of a variety of routers, including routers made by LINKSYS™ such as model number WRT54G-TM. The router must have sufficient communication and processing capability to handle wireless calls made by one or more users from a mobile device, as well to implement the other functionality described herein.
- A mobile device 320 that is enabled to access an IP-based telecommunications network. Such a mobile device may be manufactured by a variety of manufacturers, including MOTOROLA™, SAMSUNG™, NOKIA™, and others. In certain dual-mode devices, the mobile device may further be configured to operate in a first mode wherein communication is made via traditional cellular networks and in a second mode wherein communication is made via an IP-based network. Further details about switching between the various modes of operation on a dual-mode mobile device is discussed in commonly assigned U.S. patent application Ser. No. 11/480,775, entitled "SYSTEM AND METHOD FOR CONNECTING TO A VOICE NETWORK SUCH AS WIRELESSLY CONNECTING TO A UMA NETWORK," which is herein incorporated in its entirety by reference.
- An installation and use compact disc (CD) 330, which is to be inserted into a computer (not shown) that will be coupled to the wireless router 310. The CD includes appropriate programs and help files that, when run, provide step-by-step instructions to a user about the deployment and use of the various IP-based telecommunications components.
- An installation and use guide 340, which is a paper copy of some or all of the materials that are included in the CD 330. The installation and use guide is typically redundant to the CD and any online guides provided by the service provider, so may be omitted if users no longer desire to receive a hard copy.

While the product packaging 300 is depicted as containing four system components, it will be appreciated that a greater or lesser number of components may be included in the packaging depending on the intended service offering by the service provider. For example, certain users may not require a mobile device 320 if they already are in possession of such a device. Moreover, some manufacturers may ship or deliver some of the components directly to consumers, without providing the components to the service providers.

The intent of the product packaging 300 and the labeling of the components in the packaging is to make it very clear to the user how to proceed with deployment of the components. To that end, each component in the packaging and the packaging itself may contain messaging that indicates that the CD 330 should be inserted into a computer and a program on the CD run before any further steps are taken to connect or power on any of the components. For example, the flaps on the product packaging 300 may be clearly labeled "Run CD First" in various locations so that the very first message that a user receives as he or she opens the product packaging is to run the CD. Similarly, the various components may also have permanent or temporary stickers that contain a message to insert the CD into a computer before unpacking or using any of the other components. For example, a sticker 350 may be located on the router 310 and a sticker 360 may be located on the mobile device 320, each sticker repeating the message to insert the CD into the computer before powering-up or using the associated component. The sticker may be located in a fashion on each component that a user would be forced to remove the sticker prior to connecting or powering on the associated component. For example, the sticker 350 may extend across the power button on the router 310. Other components within the product packaging, such as the CD 330 and the installation guide 340 may have similar and prominent messaging on the face of each of these components. In addition to appropriate labeling, the components in the product packaging may also be packed in a manner that the first component that the user views upon opening the packaging is the CD. The user must physically move the CD (with the messaging on the CD) in order to access the other components in the packaging. The prominent placement and frequent repetition of the message to execute programs on the CD first significantly increases the likelihood that a user will follow the instructions and utilize the CD before performing any other actions.

Figure 5A:
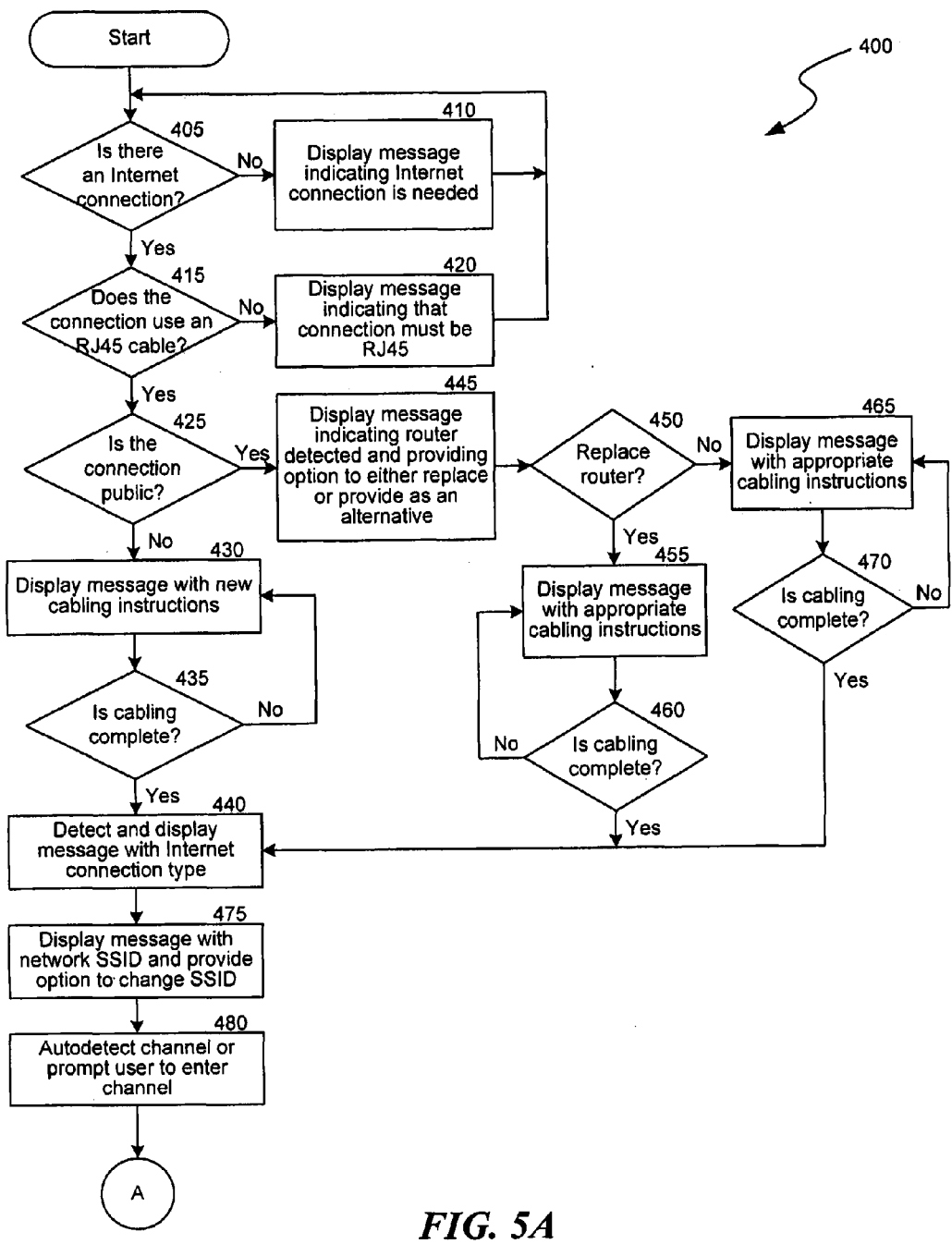
FIGS. 5A and 5B are flow charts of a process for instructing a user on how to deploy the access point for an IP-based wireless telecommunications network.
Figure 5B:
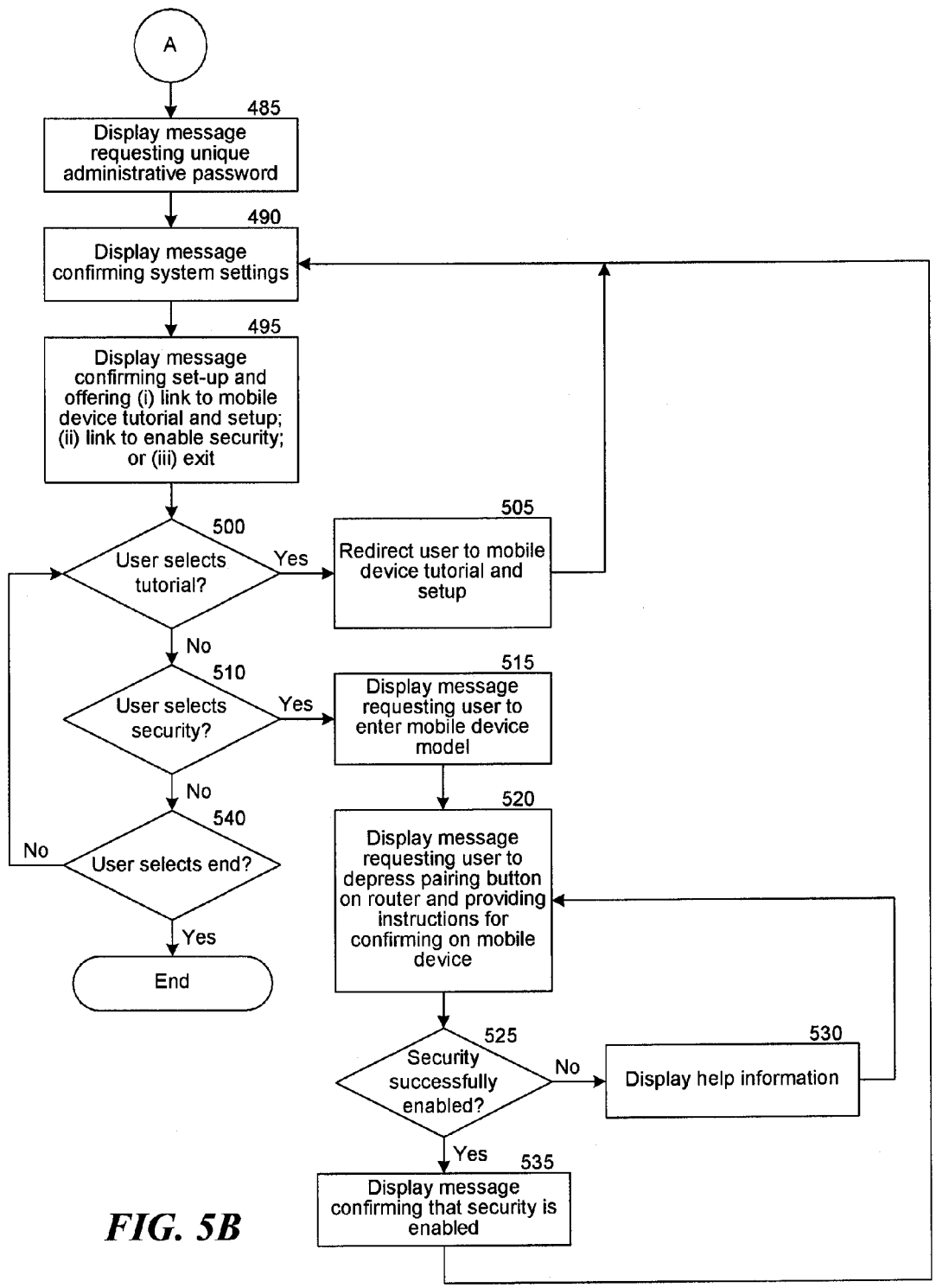

If the user inserts the CD into a computer, the CD automatically loads a set-up software facility (often referred to as a "set-up wizard") that guides the user through the deployment process. FIGS. 5A and 5B are flow charts of the set-up process 400 that is implemented by the facility. At a decision block 405, the facility determines whether the computer is connected to the Internet by attempting to access or otherwise ping a remote network address. If the computer is not connected to the Internet, at a block 410 a message is displayed to a user indicating that a broadband Internet connection is required for the access point to be installed. Set-up is thereafter halted until the user is able to provide a broadband connection for the computer. If the facility determines that the computer is connected to the Internet, setup continues to a decision block 415. At decision block 415, the facility determines whether the computer is connected to a broadband modem with an RJ45 cable, or whether the Internet connection is implemented using another type of connection (e.g., a wireless connection or USB cable). In some embodiments, installation of the access point router depends on the computer being connected with an RJ45 cable. As a result, if the connection between the computer and the broadband modem is anything other than an RJ45 cable, at a block 420 the user is notified that the modem must be connected to the computer with an RJ45 cable. Further set-up is thereafter halted until the user is able to connect the modem using an RJ45 cable.

Once it is determined that the computer is connected to the Internet using an appropriate cable to the broadband modem, at a decision block 425 the facility determines if the connection is a public connection or a private connection. If the connection is a private connection (i.e., the connection is not shared with other parties using a router) at a block 430 the facility displays a message that provides cabling instructions to connect the router 310 between the modem and the computer. At a decision block 435 the facility tests to see if the cabling has been correctly installed. If it has, the setup process proceeds to a block 440, otherwise the facility loops back to block 430 to again provide cabling instructions to the user and information about common set-up problems. The setup process does not proceed past block 435 until the router is correctly connected between the computer and the modem.

If the connection is determined to be a public connection at decision block 425 (i.e., the connection is shared with other computers using a router), the facility proceeds to block 445. At block 445, the facility displays a message to the user indicating that a router has been detected in the system and offering the user the option of either replacing the router or supplementing the existing router with the new router 310 offered by the service provider. For many users, it may be advantageous to replace the existing router with a new router from the service provider because the new router may be configured to provide superior IP-based telecommunications service when communicating with a mobile handset. Such improved service may include, but not be limited to: (i) extended wireless coverage; (ii) increased customer care support; (iii) easy secure set-up (as described in additional detail below); (iv) improved voice quality and battery life for the corresponding handset as a result of certain signaling conventions, and (v) prioritization of telecommunication traffic (e.g., voice packets) through the router as compared with other non-telecommunication traffic. At a decision block 450, the facility receives a response from the user as to whether they desire to replace their existing router. If the user elects to replace their existing router, at a block 455 the facility displays a message with appropriate cabling instructions to connect the router 310 between the modem and the computer. At a decision block 460, the facility determines whether the cabling has been completed correctly, and if so, continues to block 440. Returning to decision block 450, if the user elects not to replace their existing router, at a block 465 the facility displays a message with appropriate cabling instructions to connect the router 310 to the existing modem, router, and computer. At a decision block 470, the facility determines whether the cabling has been completed correctly, and if so, continues to block 440.

Once the cabling has been accurately completed, the facility may configure the router for the user. At a block 440, the facility detects the Internet connection type (e.g., DHCP, PPPOE) and displays the Internet connection type to the user. In some embodiments, the user is allowed to change the Internet connection type if they so desire. At a block 475, the facility displays a message with the current (default) wireless network name (SSID) and provides an option for a user to select a different SSID name, if they so choose. Selecting a different name allows the user to easily distinguish their own access point from other nearby wireless networks. At a block 480, the facility detects which channel is being used by the user's router. The channel is shared by all computers within the user's wireless network, and may be selectively changed by the user if the user experiences poor performance on a certain channel.

At a block 485, the facility displays a message asking the user to enter an administrative password for the router. The administrative password protects the routers from undesired access and modifications to the router settings. At a block 490, the facility displays a message that confirms all of the current system settings. These settings may include, but not be limited to, one or more of the following elements: the router's address, password, wireless network name (SSID), channel, encryption (enabled or disabled), passphrase and key. The user is encouraged to print the system settings for future reference should problems arise in the future.

At a block 495, the facility displays a message confirming set-up of the access point. The facility also provides a number of additional configuration options that a user may select, including, but not limited to, an option to view a tutorial or other instructional materials about the mobile device, an option to enable security on the access point, or an option to exit the facility. At a decision block 500, the facility determines whether a user has selected the option of viewing a tutorial. If the user has selected the tutorial, at a block 505, the user is redirected to further instructional materials on the mobile device. The instructional materials may include general information about the use of an IEEE 802.11 WIFI™ network to make calls, as well as specific materials about features of the mobile device. The tutorial may be stored on the CD and viewed when selected by the user, or the user may be redirected to a web page or other online resource to view the tutorial. When the user stops viewing the tutorial, or when the tutorial is complete, the set-up process returns to block 490.

At a decision block 510, the facility determines whether a user has selected the option of enabling security on the access point. If the user has selected the option of enabling security, at a block 515 the facility requests that the user enter their mobile device model number. The model number of the mobile device enables the facility to provide the appropriate security instructions as well as implement the appropriate exchange of security keys. After receiving the mobile device model, at a block 520 the facility displays a message to the user requesting that they depress a pairing button on the wireless router. It the user utilizes the router 310 provided by the service provider, in some embodiments the router includes a dedicated pairing button that, when depressed, initiates a pairing process with the mobile device that involves the exchange of security keys. If the router does not include a dedicated pairing button, an alternate method of pairing is implemented as will be discussed below. An example of a pairing button on a router may be found in International Application No. PCT/US2007/082160, filed 22 Oct. 2007, entitled "System and Method to Indicate IP-Based Wireless Telecommunication Service Availability and Related Information, which is herein incorporated by reference in its entirety.

Figure 6:
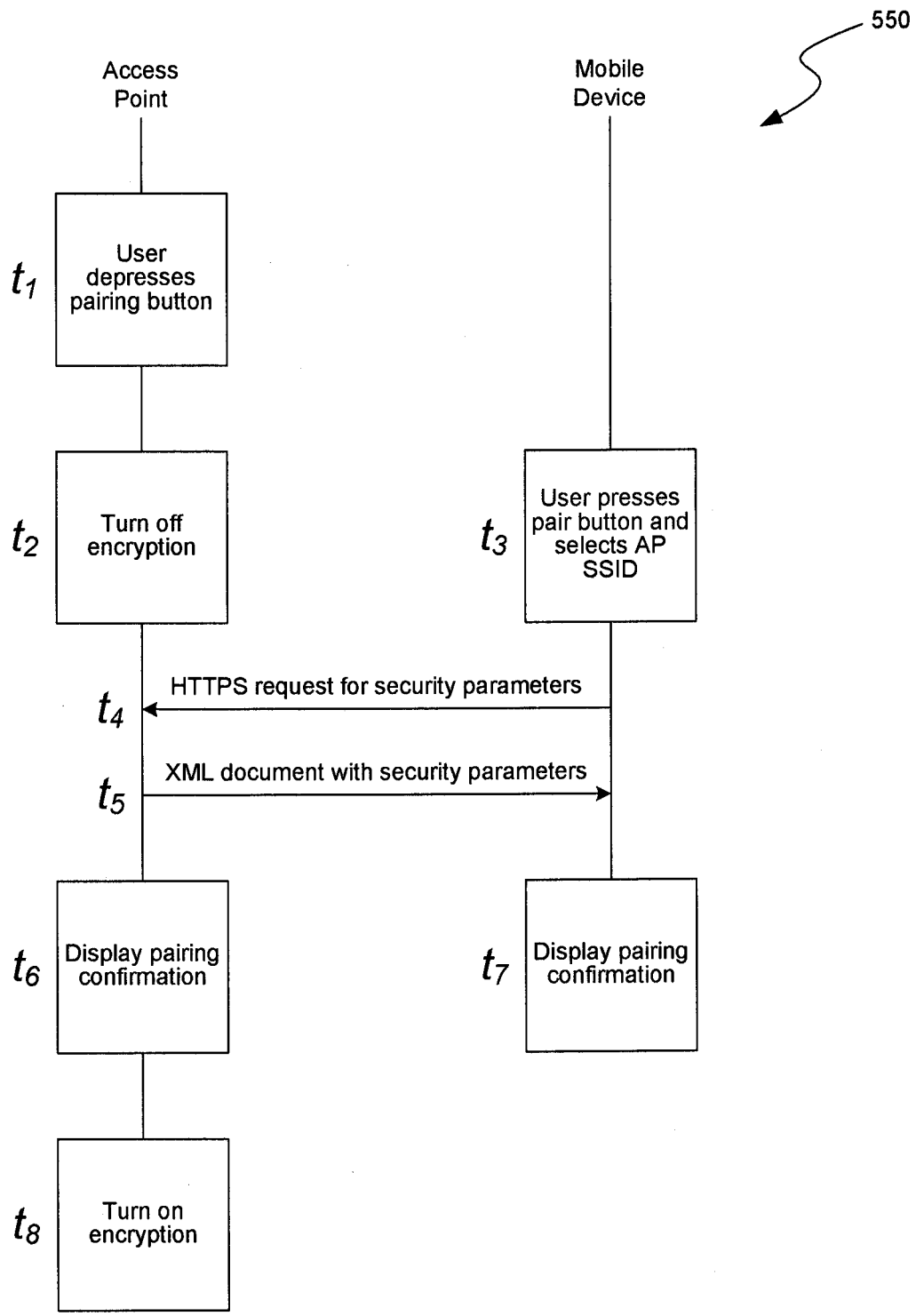
FIG. 6 is a communication diagram of messaging for securely pairing a mobile device and an access point.

FIG. 6 is a communication diagram 550 that depicts the communication flow as part of a pairing process between the access point and the mobile device. At a time $t_1$, the user depresses the pairing button on the access point to begin the pairing process. At a time $t_2$, the access point turns off any encryption and prepares to receive a pairing request. At a time $t_3$, the user implements a pairing request by pushing a button or taking another action on the mobile device. If the mobile device is within range of only one access point, the pairing request is automatically made to that access point. If the mobile device is within range of more than one access point, the user may select which access point to pair with or an automated selection may be made for the user (e.g., an automated selection of an access point that is in a list of approved access points that are maintained by the mobile device). At a time $t_4$, the mobile device sends an HTTPS request for security parameters to the access point. The mobile device request is validated by the access point by a handshake process. If the request is from an authorized mobile device, at a time $t_5$ the access point transmits an XML document or other message to the mobile device with appropriate security parameters to allow the mobile device to establish a secure communication channel with the access point. The security parameters, including a WEP, WPA, WPA2, or other security key, are randomly generated at the time that the pairing button is pushed and transmitted to the device that is to be paired. The security parameters also typically include an identifier which uniquely identifies the access point.

Once the mobile device has received the XML document or other message the securing process is complete. Additional messages (not shown) may be sent between the access point and the mobile device to confirm the pairing. At a time $t_6$, the access point displays a confirmation that the pairing is complete. Such confirmation may take the form of a confirming LED light or other visual or auditory signal to the user. At a time $t_7$, the mobile device displays a confirmation that the pairing is complete. Such confirmation may take the form of a message on the mobile device screen, an aural tone, or other signal to the user. At a time $t_8$, the access point turns encryption back on. Future communications between the access point and the mobile device are therefore provided an appropriate level of encryption to ensure that the communication remains secure if intercepted.

Figure 7:
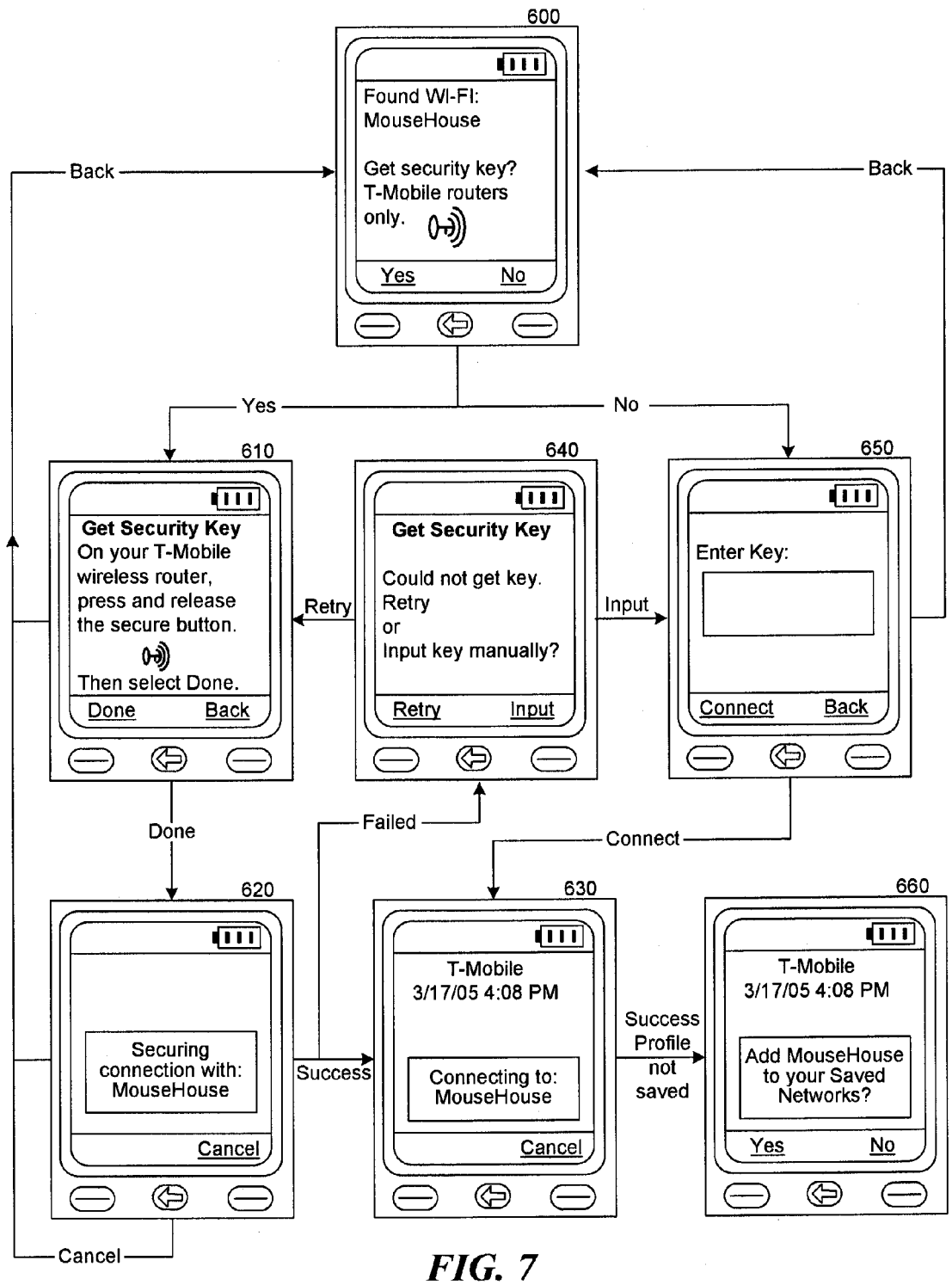
FIG. 7 are screenshots of a mobile device interface when securely pairing a mobile device and an access point.

FIG. 7 contains screenshots of a representative user interface during the pairing process on a mobile device. The screenshots are arrayed in a sequence that they may be displayed to the user during the pairing process. In a first display 600, the user is notified of an access point that has been located having the SSID "MouseHouse." The user is given the option of obtaining a security key from the router, if such functionality is available, by depressing the mobile device key corresponding to the "yes" response. If the security key is to be obtained from the wireless router, in a second display 610 the user is provided instructions to press and release the secure button on the router. In a third display 620, the user is apprised that the pairing operation between the access point and the mobile device is in progress. Such pairing operation has been previously discussed with respect to the communication diagram of FIG. 6. If the pairing operation is successful, the user is presented with a fourth display 630 that indicates that the connection with the network is being made. If the pairing operation is unsuccessful, the user is presented with a fifth display 640 that indicates that pairing has failed and provides the user with an option to retry the automatic pairing or to manually input the security key. If the user elects to retry automatic pairing, the user is presented with the second display 610 to begin the pairing process again. If the user elects to manually enter the security key, the user is presented with a sixth display 650 that provides a data entry field to allow the user to enter a WEP security key, WPA passphrase, or similar security string associated with the access point. The security string may be entered using the mobile device keypad, using a touchscreen and stylus, or via any other data entry method. In order to manually enter the security string, the user must, utilize a computer to view the access point settings and identify the security string being used by the access point. Once the mobile device has successfully paired with the access point and connection with the network established, the user is presented with a seventh display 660 that allows the user to save the access point in a list of stored networks that are maintained on the mobile device.

Returning to FIG. 5B, at a decision block 525 the facility determines whether the mobile device was successfully paired with the access point. If the mobile device was not successfully paired, at a block 530 the facility displays help information to the user and processing continues to block 520 to allow the user to re-attempt the pairing process. If the block was successfully paired, at a block 535 the facility displays a message to the user confirming that security has been enabled. The message may be displayed in a variety of forms, as was previously discussed with respect to FIGS. 6 and 7. When security has been successfully enabled, the set-up process returns to block 490.

At a decision block 540, the facility determines whether a user has selected the option of ending the set-up process. The user may end the set-up process regardless of whether they have viewed the tutorial or opted to enable security. The disclosed set-up process is simple and intuitive for all users, thereby facilitating the adoption and use of IP-based telecommunications network devices.

A disadvantage of the pairing process discussed with respect to FIGS. 6 and 7 is that it may be difficult to pair devices such as computers, cameras, printers, or other devices that are not configured to accept the randomly-generated security parameters that are transmitted from the access point. For devices that are not configured to pair with an access point, a user must use a computer to view the access point settings and identify the security key and other security parameters being used. Such security key may then be manually entered in other devices to allow the devices to pair with the access point.

In order to overcome some of the shortcomings that result from using a randomly-generated key, a process may instead be used that utilizes a pre-determined security key that is stored in the access point. That is, a security key is generated by the manufacturer of the access point and stored in the access point prior to shipment of the access point. The security key is stored in a manner that would make it difficult for a party that is attempting to breach the access device to discover the identity of the key. For example, the security key may be stored in an encrypted fashion or in a memory area that is difficult to locate and/or tamper with. The security key is unique to the access point and may be a WPA, WPA2, 802.11i or similar key.

Figure 8:
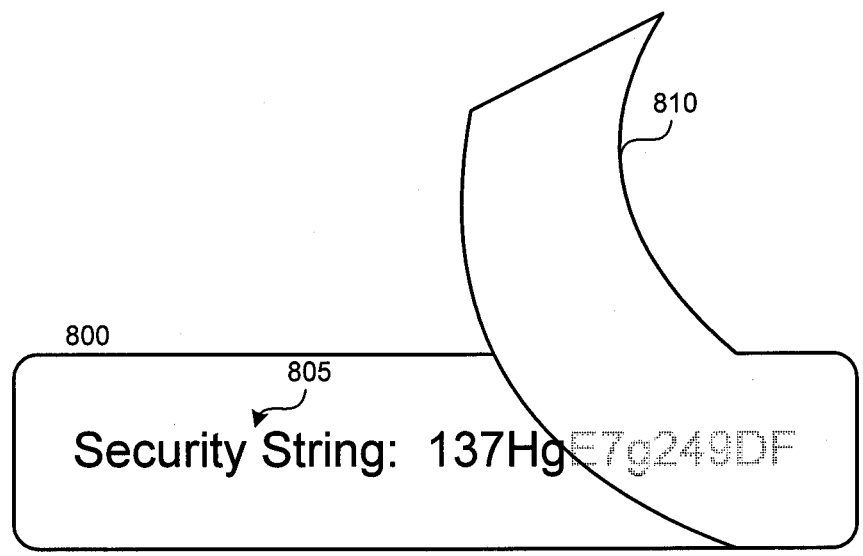
FIG. 8 is a perspective view of a label containing a passphrase that may be applied to an access point, access point instructions, or access point packaging.

To facilitate use of the pre-determined security key, a printed label that contains a passphrase that can be used to derive the security key is associated with the access point. FIG. 8 is a perspective view of a label 800 that may be applied to an access point, access point printed instruction manual, or other access point packaging. The label contains a pre-determined passphrase 805 that is uniquely assigned to the access point. ("Unique" implying that the passphrase is sufficiently different from other passphrases to ensure a desired level of security for the access point.) In some embodiments, the passphrase 805 is a phrase of 8 to 63 ASCII characters. The passphrase characters are used by a device that is to be paired with the access point to derive a 256 bit or greater security key that matches the pre-determined security key of the access point. The security key (WPA, WPA2, 802.11i, or the like) may be derived from a hash function that uses the passphrase and the SSID, MAC address, or other identifier associated with the access point in a key derivation function. Printing the pre-determined passphrase that is associated with the access point on a label allows the user of the access point to easily use or disseminate the passphrase to enable devices to pair with the access point. For example, a device that is unable to pair using the automated pairing method depicted in FIG. 6 may instead be paired with the access point by a user manually entering on a device the passphrase that is printed on the label. The use of a label with a passphrase therefore extends the number of devices that may pair with an access point, such as router 310.

The label 800 may be constructed in a way that reduces the risk that the passphrase can be identified and misused by someone hoping to gain access to the access point. For example, the label may be constructed to be removed from the access point, instructions, or packaging to allow a user of the access point to save the label (and therefore passphrase) in a secure location. As another example, the label may have an opaque covering 810 that must be removed prior to being able to view the passphrase. The covering would preclude a casual observer from being able to see and record the passphrase. Moreover, if a user purchased an access point having a label with the covering 810 removed or loosened, it would indicate to the user that the passphrase may have been compromised during the distribution process. While the term "label" is used throughout to refer to a paper or cloth slip that is affixed to the access point or other materials, the term label is intended to be broadly interpreted to extend to any printed insert that is included with the access point to convey the passphrase.

Figure 9A:
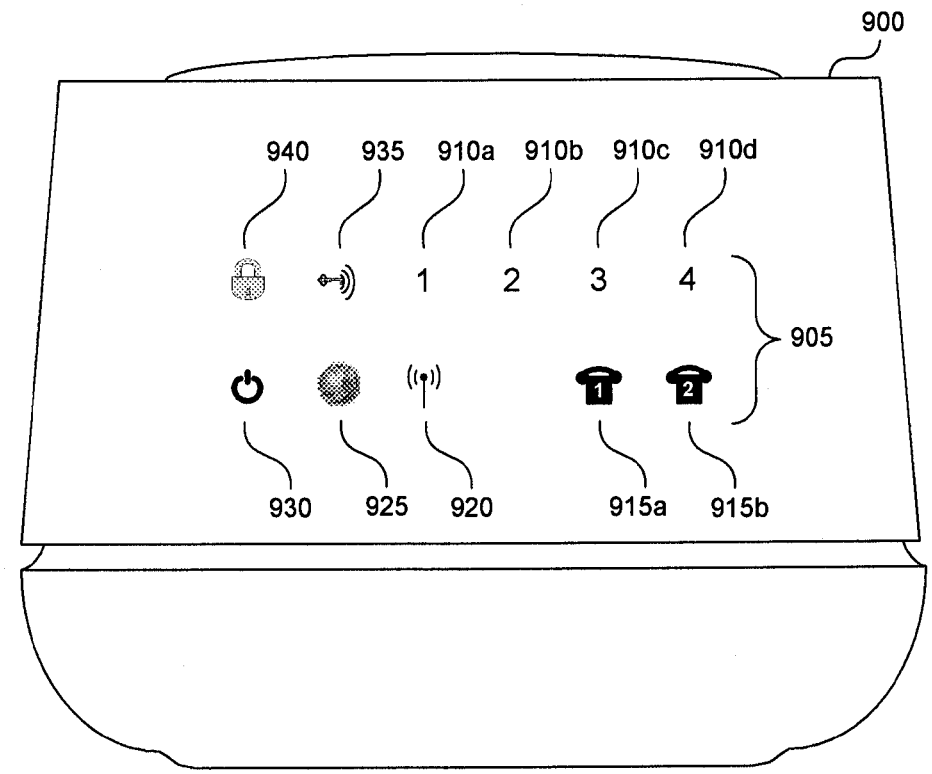
FIGS. 9A and 9B are front and rear views of an access point having a display interface and controls to facilitate pairing with remote devices using a pre-determined security key or a personal security key.
Figure 9B:
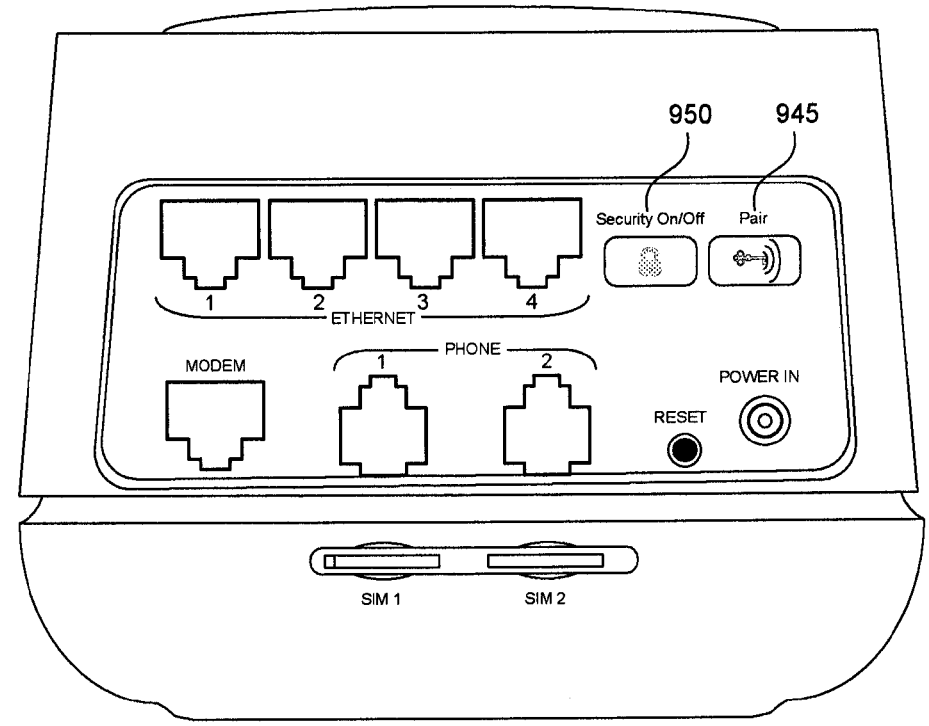

In addition to a label, the access point may also contain controls that enable a user to select a personal security key rather than use the pre-determined security key that is associated with the access point. FIG. 9A is a view of the front panel and FIG. 9B is a view of the back panel of a representative access point 900. The panels contain controls that may be used in the pairing process to enable a user to utilize a personal security key rather than a pre-determined security key. As depicted in FIG. 9A, the access point 900 includes a display 905 to provide a visual indication to a user as to the status of the access point. The display 905 includes Ethernet connection icons 910a-910d, phone icons 915a-b, a wireless icon 920, an Internet icon 925, and a power icon 930. The Ethernet connection icons 910a-d indicate the number of devices that are currently connected to the access point 900 via Ethernet cables. While four connection icons are depicted in FIG. 9A, a greater or lesser number of icons may be present depending on the number of connections that are supported by the access point 900. The phone icons 915a-b indicate that one or more phones are connected to the access point. The network status of the access point is provided by the wireless icon 920, which indicates that wireless access is available, and the Internet icon 925, which indicates that the access point is connected via a broadband connection to the Internet. Internet connectivity means that the access point 900 is able to obtain valid IP and DNS addresses and access resources associated with these addresses. The power icon 930 indicates when power has been applied to the access point. All of the icons in the display 905 may have an on/off state to represent the presence or absence of the corresponding condition, or may have multiple states such as blinking or different colors (e.g., red, yellow, green) to represent additional information about the corresponding condition.

The display 905 also contains two icons that represent the security settings of the access point. A pairing icon 935 lights or flashes to indicate when the access point is in the process of pairing with a nearby device. A security icon 940 is lit when a security key in the access point is enabled (i.e., when security is enabled for the access point). While lighted graphical icons are utilized in the access point display in the present example, those skilled in the art will appreciate that other interfaces may be used to convey status information to a user, such as colored lights or text displays.

In order to allow a user to use a personal security key rather than use the pre-determined security key that is associated with the access point, the access point is provided with a set of easy-to-use controls. As depicted on the back panel shown in FIG. 9B, the access point includes a pairing button 945 and a "security on/off" button 950. When pressed, the pairing button 945 commences a process of pairing a mobile device to the access point 900 similar to the process previously described herein (initiated, for example, at block 520 of FIG. 5B, at time $t_1$ in FIG. 6, as a result of second display 610 of FIG. 7). Pressing the pairing button 945 signals the access point 900 to enter a non-secure mode during which messages may be exchanged with a mobile device to enable the mobile device to establish secure communication sessions with the access point. Rather than transmit a randomly generated security key, however, pressing the pairing button 945 causes the access point to transmit the pre-determined security key to the mobile device that is to be paired.

In contrast to the automatic pairing that is established by pressing the pairing button 945, in certain circumstances a user may desire to use a different security key other than the pre-determined key that is stored in the access point. For example, the user may desire to select a personal security key that is to be used across all devices that are owned or operated by the user. In such circumstances, the user may press the "security on/off" button 950 in order to use the personal security key as follows:

In some embodiments, pressing the security on/off button 950 once immediately disables use of the pre-determined security key that is utilized by the access point and enables use of a personal security key that has been specified by a user. Pressing the security on/off button again re-enables use of the pre-determined security key and disables use of the personal security key. A user may therefore decide whether to enable or disable use of the pre-determined security key by the access point depending on the desired network configuration. In these embodiments, security of the access point is enabled by default and the security on/off button merely determines whether the pre-determined security key is enabled or disabled by the access point.

In some embodiments, pressing the security on/off button 950 once immediately disables all security for the access point. That is, the access point is switched to operate in an open state whereby any device can access the access point. Pressing the security on/off button 950 a second time re-enables security for the access point. If a user has entered a personal security key, upon pressing the security on/off button a second time the personal security key is automatically used by the access point in lieu of the pre-determined security key. Alternatively, if the user has not entered a personal security key, the pre-determined security key is used by the access point when the security on/off button is pressed a second time and security is re-enabled. In situations where the access point is currently operating using a personal security key, but a user would like to return to operation of the access point using the pre-determined security key, the user may need to reset the access point in some fashion (e.g., powering the access point down and then back up) in order to return to a start-up state wherein the pre-determined security key is used by the access point.

Those skilled in the art will appreciate that while push buttons are depicted in FIG. 9B, other controls such as switches, toggles, or the like may be used. Such controls may incorporate an indicator light to provide a visual indication to a user as to the position of the control and whether, for example, a pre-determined security key is enabled or disabled for an access point based on the control position.

Figure 10:
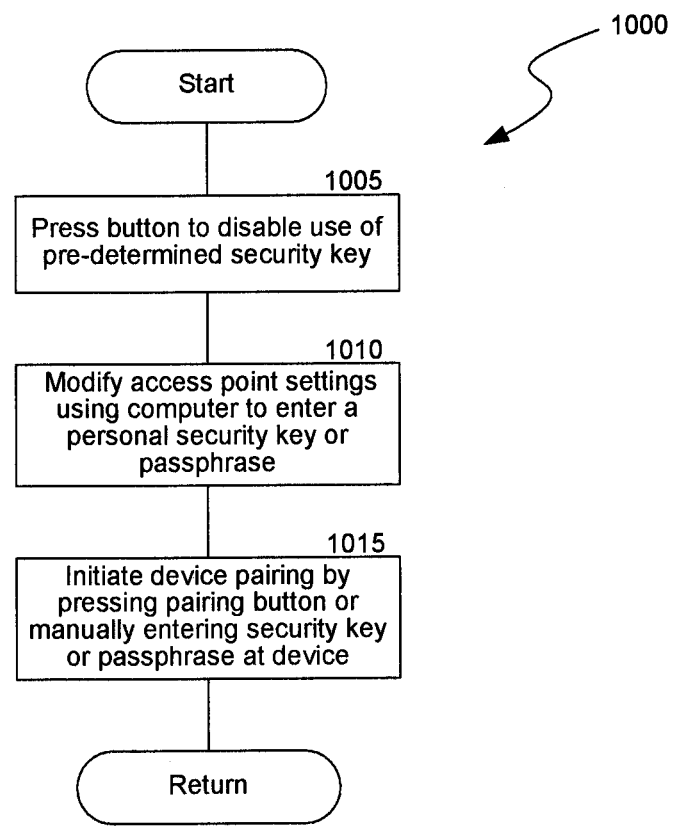
FIG. 10 is a flow chart of a method of using a personal security key rather than a pre-determined security key at an access point.

FIG. 10 is a flow chart of a process 1000 for configuring the access point to use a personal security key rather than the pre-determined security key that is stored in the router. At a block 1005, a user presses the security on/off button 950 to disable use of the pre-determined security key that is utilized by the access point (i.e., the first functionality of the security on/off button 950 described above has been incorporated into the access point). At a block 1010, the user modifies the access point settings using a computer to enter a personal security key or passphrase that is used to generate a security key. The security key may be a WPA, WPA2, 802.11i or similar key. It will be appreciated that blocks 1005 and 1010 may be performed in any order to populate the access point with the user's personal security key or passphrase. Once the user's personal security key or passphrase has been entered into the access point, at a block 1015 the user may initiate pairing of a device with the access point. If supported, pairing of the device with the access point may be automatically performed by selecting the pairing button 945. Alternatively, the user may manually enter the personal security key or passphrase into the device that is to be paired. By allowing a user to easily select between the use of a pre-determined security key or a personal security key, the access point offers significant flexibility to the user that does not exist in current access points.

Figure 11:
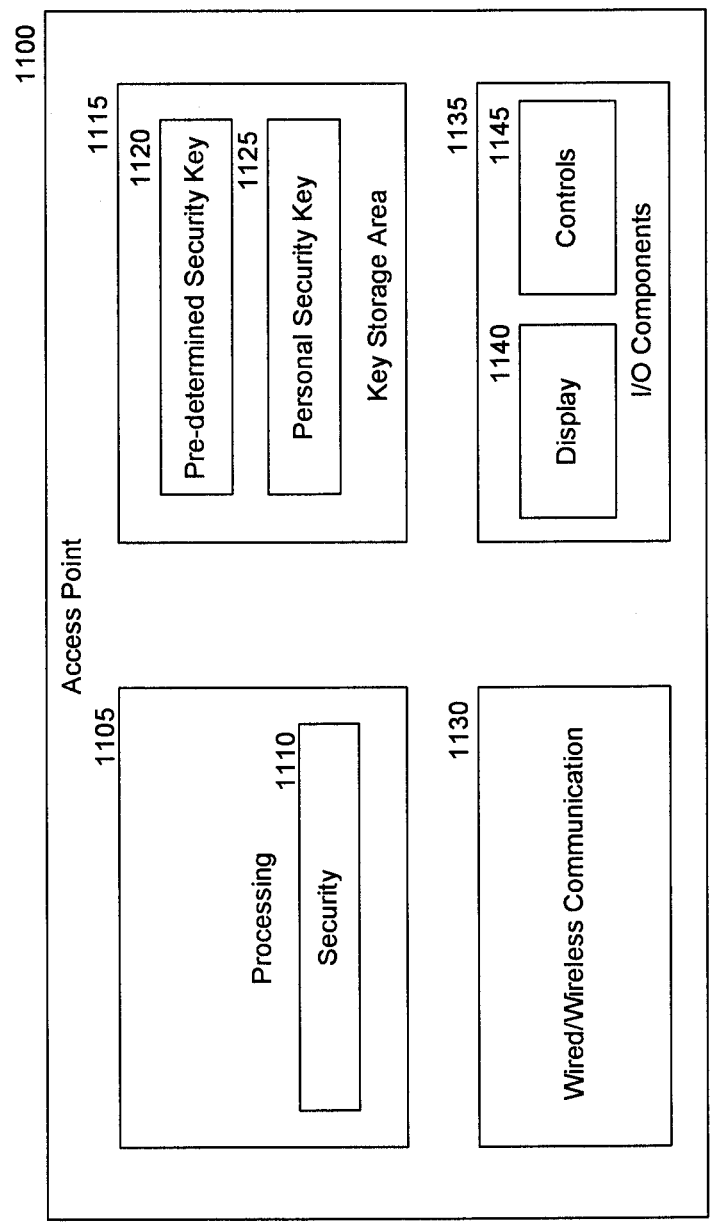
FIG. 11 is a block diagram of access point components that allow use of a pre-determined security key and a personal security key.

FIG. 11 is a block diagram of components in an access point 1100 that allow use of a pre-determined security key and a personal security key. The access point 1100 contains a processing system 1105 that includes a software and/or hardware security component 1110. The security component 1110 is configured to encrypt and decrypt communications using a stored security key. The stored security key is retrieved from a key storage area 1115, which stores a pre-determined security key 1120 and, if provided by a user, a personal security key 1125. Communications encrypted with the security key are exchanged with a remote device via a wired/wireless communication component 1130. To enable a user to select whether to use the pre-determined security key or the personal security key, the access point contains a number of input/output components 1135, such as a display 1140 for displaying one or more icons depicting access point status and controls 1145 for enabling/disabling security, entering a security string (as will be described in conjunction with FIG. 12), and controlling the pairing operation. One skilled in the art will appreciate that certain standard components are omitted from FIG. 11 for clarity, and that additional and/or different configurations may be utilized to provide similar access point functionality.

Figure 12:
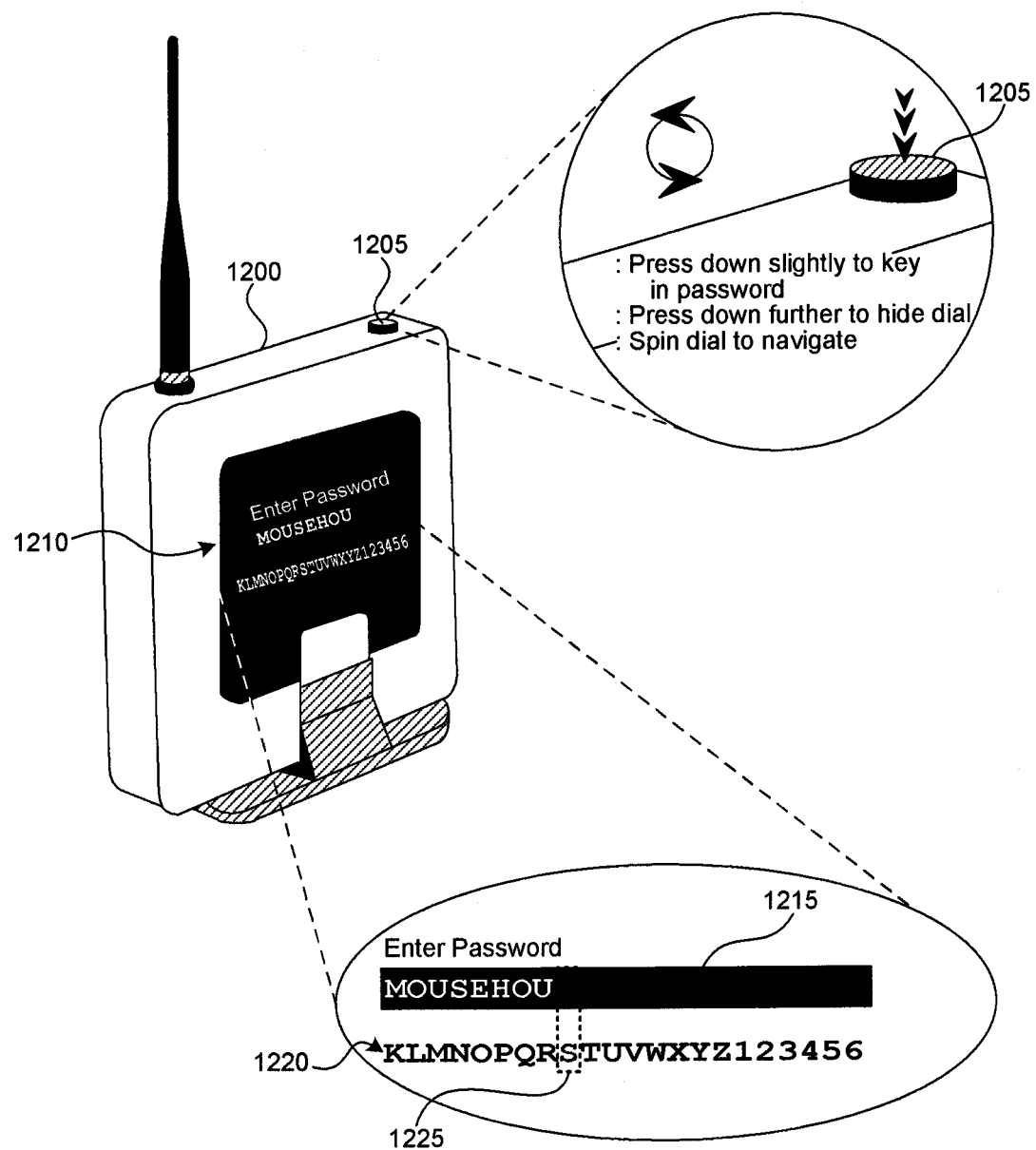
FIG. 12 is a perspective view of an access point that contains a control for direct entry of a security string by a user.

In some embodiments, an additional input control may be provided on an access point to enable a user to enter and use a personal security key on the access point. FIG. 12 is a perspective view of a wireless access point 1200 that includes a rotary dial 1205 and a display 1210. The rotary dial 1205 allows a user to manually enter a security string into the access point without having to use a computer to change the access point settings. To enter a security string, the user may press down and release the rotary dial 1205 to cause the rotary dial, which is normally stowed in a flush position in the housing of the access point, to extend from the access point. When extended, the rotary dial causes the access point to enter a string entry mode wherein the display 1210 is turned on and a character-entry interface displayed to the user. The interface may comprise an entered text field 1215, a scrolling alphanumeric ribbon 1220, and a cursor 1225. As the user spins the rotary dial clockwise and counter-clockwise, the alphanumeric ribbon scrolls forward (i.e., right to left) or backward (i.e., left to right). As the alphanumeric ribbon scrolls, a character is highlighted by the cursor 1225. The character may be an alphabetic character, a numeric character, punctuation, or any other icon or symbol. When a desired character is highlighted, the user presses the rotary dial 1205 to select the highlighted character. In this fashion, the user may enter a security string on a character-by-character basis. For example, in FIG. 12 the user has so far entered the security string "MOUSEHOU". The cursor 1225 is currently highlighting the "S" character, so if the user were to depress the rotary dial the character "S" would be added to the displayed security string in the entered text field 1215. When the user reaches the end of the security string, the user selects an icon or symbol from the scrolling character ribbon that indicates the end of the string. For example, a symbol containing the characters "END" may be displayed in the character ribbon to allow a user to specify that the end of the character string has been reached. After the security string is completed, the access point may delete the string from the display 1215 so that it cannot be viewed by subsequent users or other observers. In addition, the access point uses the security string to derive and store a 256 bit or greater personal security key for the access point. The rotary control may be depressed such that the top of the control is again flush with the surface of the access point housing. Returning the rotary control to the stowed position causes the access point to turn off the display 1210. The rotary dial 1205 thereby facilitates a user's use of a personal security key in the access point. While a rotary dial is depicted as the input control, those skilled in the art will appreciate that other controls, such as two buttons, a rocker switch, etc., may be used in conjunction with a scrolling character ribbon or other character-entry interface to allow a user to specify a security string.

III. CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples, and alternative implementations may employ differing values or ranges.

The teachings of the methods and system provided herein can be applied to other systems, not necessarily the system described above. The elements and acts of the various embodiments described above can be combined to provide further embodiments.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A wireless router system that facilitates the installation and pairing of a wireless router to create an access point to an IP-based wireless telecommunications network, the wireless router solution comprising:
a wireless router comprising:
a communication component for wirelessly communicating Internet Protocol (IP) formatted data with a remote device,
wherein the remote device is configured to transmit and receive communications via a wireless connection;
a security component coupled to the communication component for encrypting the IP-formatted data in accordance with a security key;
a first key storage area containing a pre-determined security key that is chosen by a manufacturer of the wireless router;
a second key storage area which is suitable for storing a user-created security key that is received from a user, and
wherein the user-created security key differs from the pre-determined security key;
a first control that allows a user to select whether the pre-determined security key or the user-created security key is used as the security key to encrypt the IP-formatted data by the security component, and
wherein selection of the first control enables use of the user-created security key;
a second control that when enabled, causes the selected security key to be transmitted to the remote device to permit the remote device to pair with the wireless router and to communicate with the wireless router in a secure fashion,
wherein the first control is selected prior to selecting the second control; and
a label associated with the wireless router that contains a passphrase that corresponds to the pre-determined security key stored in the first key storage area,
wherein the passphrase allows the pre-determined security key to be generated by the remote device when the passphrase is used in a key derivation function that is executed by the remote device.

2. The wireless router system of claim 1, wherein the first and second controls are push button switches.

3. The wireless router system of claim 1, wherein the label is affixed to the wireless router.

4. The wireless router system of claim 3, wherein the label is removable from the wireless router.

5. The wireless router system of claim 1, wherein the label is affixed to a set of instructions associated with the wireless router.

6. The wireless router system of claim 1, wherein the label is affixed to packaging associated with the wireless router.

7. The wireless router system of claim 1, wherein the label comprises a first portion containing the passphrase and a removable second portion that covers the first portion and prevents access to the passphrase until the second portion is removed.

8. The wireless router system of claim 1, wherein the pre-determined security key is a WPA or WPA2 key.

9. The wireless router system of claim 1, wherein the security component disables the encryption before transmitting the selected security key to the remote device.

10. The wireless router system of claim 9, wherein the security component re-enables the encryption after transmitting the selected security key to the remote device.

11. The wireless router system of claim 1, further comprising a display that displays when the selected security key has been successfully transmitted to the remote device.

12. The wireless router system of claim 1, wherein the selected security key is a WPA or WPA2 key.

13. The wireless router system of claim 1, wherein the user-created security key is received from a computer that is coupled to the wireless router.

14. The wireless router system of claim 1, wherein the first key storage area and the second key storage area are within a common storage area.

15. The wireless router system of claim 1, wherein upon operating the first control a first time, the pre-determined security key is disabled from use, and, upon operating the first control a second time, the user-created security key is enabled for use.

16. The wireless router system of claim 1, wherein upon operating the first control a first time, the pre-determined security key is disabled from use and the user-created security key is enabled for use.

17. The wireless router system of claim 1, further comprising a third control that enables the user to enter the user-created security key.

18. The wireless router system of claim 17, wherein the third control is a rotary dial.

19. A method that facilitates the installation and pairing of a wireless router to create an access point for a remote device to wirelessly communicate with an IP-based wireless telecommunications network, the method comprising:
retrieving a pre-determined security key that is stored in a first storage area of the wireless router,
wherein the pre-determined security key is chosen by a manufacturer of the wireless router;
using the retrieved pre-determined security key to encrypt Internet Protocol (IP) formatted data for communication with one or more remote devices via a wireless communication link;
detecting a first selection of a first control that allows a user to select whether the pre-determined security key or a user-created security key is to be used as the security key to encrypt the IP-formatted data by the security component, and
wherein selection of the first control enables use of the user-created security key;
upon selection of the first control, receiving a user-created security string from the user,
wherein the user-created security string differs from the pre-determined security key;
using the received user-created security string to generate and store a user-created security key in a second storage area; and
detecting a second selection of a second control that, when enabled, causes the user-created security key to be transmitted to the remote device to permit the remote device to pair with the wireless router and to communicate with the wireless router in a secure fashion, wherein the first control is selected prior to selecting the second control.

20. The method of claim 19, where the pre-determined security key is selected by a manufacturer of the wireless router.

21. The method of claim 19, wherein using the received user-created security string to generate a user-created security key comprises using the received user-created security string in a key derivation function to generate the user-created security key.

22. The method of claim 19, wherein the first and second storage areas are within a common storage area.

23. The method of claim 19, wherein the user-created security string is a passphrase.

24. The method of claim 19, wherein the first and second controls are push button switches.

25. The method of claim 19, further comprising sending a command to a display to cause the display to indicate whether the pre-determined security key is being used by the wireless router or whether the user-created security key is being used by the wireless router.

26. The wireless router of claim 19, wherein the pre-selected security key and the user-created security key are WPA or WPA2 keys.

27. The wireless router of claim 19, wherein the user-created security string is received from a user computer that is coupled to the wireless router.

* * * * *

UNITED STATES PATENT AND TRADEMARK OFFICE
CERTIFICATE OF CORRECTION

| | | |
|---|---|---|
| PATENT NO. | : 8,484,457 B2 | Page 1 of 1 |
| APPLICATION NO. | : 12/401550 | |
| DATED | : July 9, 2013 | |
| INVENTOR(S) | : Winkler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 357 days.

Signed and Sealed this
Tenth Day of February, 2015

Michelle K. Lee
*Deputy Director of the United States Patent and Trademark Office*